United States Patent
Gou et al.

(10) Patent No.: US 7,499,446 B1
(45) Date of Patent: Mar. 3, 2009

(54) REMOVING JITTER IN RTP STREAMING MEDIA STREAMS

(75) Inventors: Dayin Gou, San Jose, CA (US); Madhavi Kadiyala, Fremont, CA (US); Xiaomei Liu, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 1761 days.

(21) Appl. No.: 10/135,223

(22) Filed: Apr. 29, 2002

(51) Int. Cl.
*H04L 12/28* (2006.01)

(52) U.S. Cl. .................................. 370/389; 370/516

(58) Field of Classification Search ......... 370/352–358, 370/389, 516, 395.64, 519, 428, 396.64, 370/229, 235, 231, 232
See application file for complete search history.

(56) References Cited

U.S. PATENT DOCUMENTS

| | | |
|---|---|---|
| 5,497,200 A | 3/1996 | Otaki et al. |
| 5,543,853 A | 8/1996 | Haskell et al. |
| 5,543,854 A | 8/1996 | Morikawa et al. |
| 5,565,924 A | 10/1996 | Haskell et al. |
| 5,594,553 A | 1/1997 | Sato |
| 5,740,186 A | 4/1998 | Widmer ..................... 371/37.1 |
| 5,828,414 A | 10/1998 | Perkins et al. |
| 5,862,450 A | 1/1999 | Mandal et al. |
| 5,905,732 A | 5/1999 | Fimoff et al. ............... 370/516 |
| 6,101,195 A * | 8/2000 | Lyons et al. ................ 370/498 |
| 7,173,945 B1 * | 2/2007 | Liu et al. .................... 370/516 |

OTHER PUBLICATIONS

ISO/IEP "Information Technology-Generic Coding Of Moving Pictures And Associated Audio Information: Video", ISO/IEC 13818-2, 1995, 209 pages.
Pixstream, Inc., "Canadian Usage", Nov. 1999.
Pixstream, Inc., "Nevada Trade Show Offer for Sale", Nov. 1999.
Java.sun.com, PixStream Introduces VDSmanager Portfolio Video Networking Management Software, Jun. 7, 1999.

* cited by examiner

*Primary Examiner*—Brenda Pham
(74) *Attorney, Agent, or Firm*—Weaver Austin Villeneuve & Sampson LLP

(57) ABSTRACT

The present invention addresses the issue of jitter and clock drifting in streaming media applications. The present invention utilizes the Real Time Transaction Protocol (RTP) to embed MPEG packets within RTP packets in a Multiple Program Transport Stream (MPTS). Each MPEG packet in an MPTS stream is tagged at a gateway with: an arrival timestamp, a per-flow index and internal index to identify where the packet resides in an RTP packet and within a stream. After demultiplexing, this information is utilized in conjunction with the sending timestamp of each RTP packet to create a sending time for each MPEG packet to aid in the reduction of jitter and clock drifting.

20 Claims, 8 Drawing Sheets

REMOVING JITTER IN RTP STREAMING MEDIA STREAMS

FIELD OF THE INVENTION

The present invention relates to the issue of jitter combined with clock drifting in streaming media systems such as Video on Demand (VoD).

BACKGROUND OF THE INVENTION

Streaming media systems such as Video on Demand (VoD) provide streaming media to a viewer. Streaming media may be a movie, television show or other multi-media information. Streaming media may be transported over a variety of mediums such as coaxial cable or satellite. Further, streaming media may be sent in a variety of formats such as MPEG over the Internet. Regardless of the format in which the streaming media is transmitted, it will be broken up into "packets". Each packet provides a portion of the transmission.

In order for a receiver of the transmission (e.g. a digital television) to properly decode and display the transmission, the packets must arrive in order and on time. Unfortunately, this is not always the case. As packets of a transmission may traverse different network paths from transmitter to receiver, the original timing among the packets may be altered due to the different delay of each network path or router's internal buffering of the same network path. The variation of spacing between packets is referred to as jitter. A more precise definition of jitter is provided by the International Telecommunication Union (ITU), namely:

Jitter: Short-term variations of the significant instants of a digital signal from their ideal positions in time.

When a real time application, such as a digital television, receives packets of information, the packets are displayed as they are received. However, if a new packet arrives while previous packets are still being displayed, it is necessary to buffer the new packet. Buffering requires the use of a high speed storage device, which adds to the cost of the display device. Conversely, if a packet arrives too late, there is an interruption in the display of the transmission, which is obvious and annoying to the viewer.

To add further complexity, a transmission may contain multiple "streams" of information, for example one stream for each movie and one stream for each set of commercials. The combining of multiple streams into a single transmission is known as multiplexing. By its very nature, multiplexing introduces jitter. By placing packets from one stream between packets from another, time delays and thus the possibility of jitter, are introduced. Further, jitter may be introduce in non-multiplexed environments if packets are not managed properly.

There is thus a need for a simple and cost effective solution to reduce jitter in a streaming media environment. The present invention addresses this need.

DETAILED DESCRIPTION OF THE INVENTION

Figure 1:
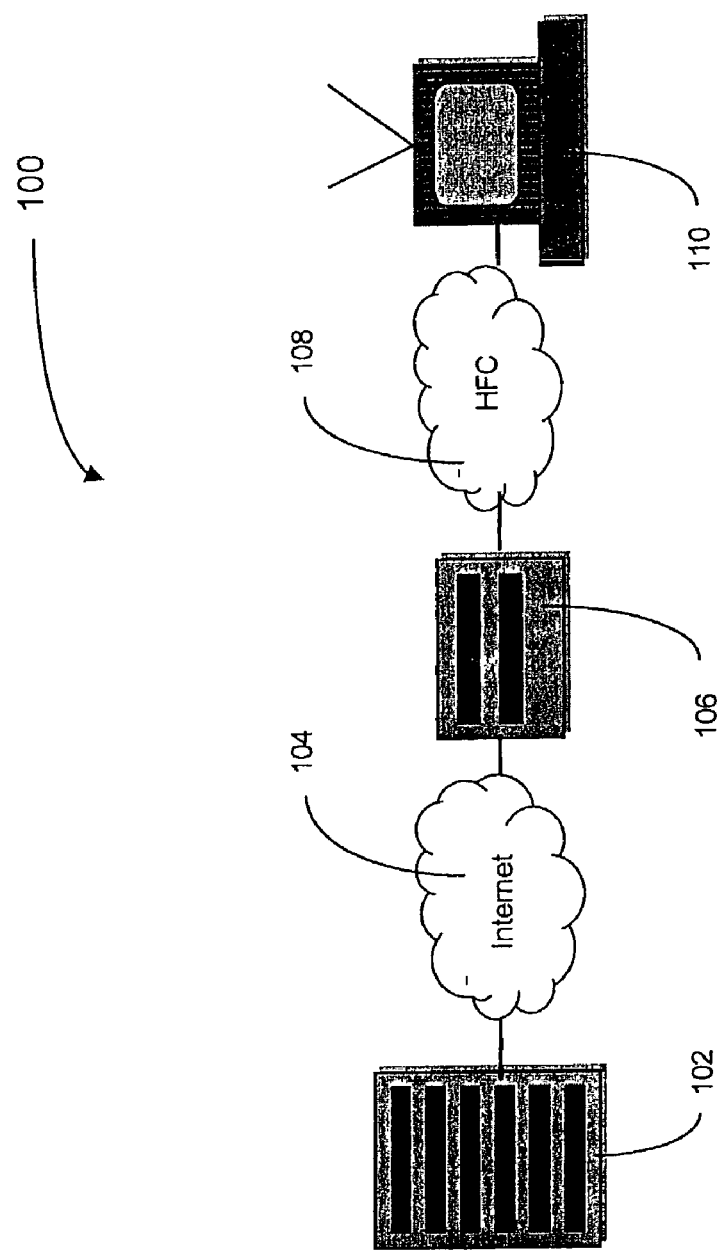
FIG. 1 is a block diagram of a Video on Demand system.

Referring now to FIG. 1, a block diagram of a Video on Demand (VoD) system is shown generally as 100. System 100 comprises three major components, namely video source 102, which provides a source video for transmission, gateway 106 and a video decoder 110. Internet protocol (IP) network 104 (such as the Internet) connects video source 102 with gateway 106. Gateway 106 is connected to decoder 110 by Hybrid Fiber Coaxial Cable (HFC) network 108.

The example of IP network 104 and HFC network 108 is provided for illustration only, it is not the intent of the inventors to limit the use of the present invention to a specific protocol such as IP or a specific delivery method such as HFC. They serve simply as examples to aid the reader in understanding the present invention.

HFC is a telecommunications link in which optical fiber cable and coaxial cable comprise different portions of a network carrying content such as VoD. By way of example, VoD system 100 may use fiber optic cable from video gateway 106 to a plurality of serving nodes (not shown) located near decoders 110 and then use coaxial cable from the serving nodes to connect with decoders 110. An advantage of HFC is that the high bandwidth of fiber optic cable may be provided to a user without having to replace all existing coaxial cable.

Gateway 106 also provides remuxing, transrating or transcoding of the input from IP network 104, which is typically in the MPEG-2 transport format. MPEG-2 refers to a portion of the standards for high quality video transmission developed by the Motion Pictures Expert Group (MPEG). The set of MPEG-2 MPEG standards is catalogued by the International Standards Organization (ISO) as ISO 13818. Although a system such as system 100 will typically make use of MPEG-2, It is not the intent of the inventors to restrict the present invention to MPEG-2. Hereinafter we will be use the generic term MPEG in the disclosure, figures and claims to encompass all forms of MPEG transmission. Further, it is not the intent of the inventors to restrict the present invention to the use of MPEG only transmissions but to encompass any other streaming media transmission protocol that may utilize the present invention.

The term "mux" is a short form for "multiplexing". Multiplexing simply means combining a number of signals over a single connection, such as multiple telephone calls over a single wire. Video source 102 may multiplex signals before transmitting them to gateway 106. Gateway 106 may "remux": the signals before sending them on. Remuxing, is simply the step of demuxing (i.e. undoing the step of muxing) and providing a newly multiplexed signal. The step of remuxing, is typically performed to ensure that the signal received from IP network 104 is properly distributed to HFC network 110. Once demuxing has been completed, gateway 106 may transrate or transcode the packets of the stream received. Transrating refers to a change in the content of the stream, typically achieved by reducing the information transmitted. Transcoding refers to a change in the format of the packets in a stream, for example from MPEG-2 to MPEG-4.

For video decoder 110 to play back the video transmission from video source 102 smoothly and continuously, the delay between video source 102 and video decoder 110 must be constant. However, this condition cannot be automatically satisfied in VoD system 100 if no corrective measures are taken due to the following reasons:

1. Although the delay between gateway 106 to decoder 110 may be regarded as constant, the connection from video source 102 to the gateway 106 is dependant upon IP network 104 so jitter will be introduced; and 2. The actual clock frequencies used for a timestamp reference running at gateway 106 and video source 102 may be different although both of them should typically run at a common clock speed, such as 27 Mhz.

To ensure the correct operation of video decoder 110, gateway 106 should deliver packets with a constant time delay. To enable system 100 to deliver packets on a timely basis, a timestamp is typically attached to each packet by gateway 106 to indicate when the packet arrived from video source 102. If packets are not delivered with a constant delay, after some time, the smooth and continuous playback at video decoder 110 will be disrupted due to underflow or overflow of video buffer memory. The issue of delivery without a constant delay also involves the differences between the times of the clocks on video source 102 and gateway 106. Such a difference is referred to as "clock drifting".

One approach to removing jitter and compensating for clock drifting even though timestamp clocks are running at different frequencies at video source 102 and gateway 106 is disclosed in U.S. patent application Ser. No. 10/096,191 filed on Mar. 11, 2002 and titled "Removing Jitter by Adaptive Slope Tracking", which is hereby incorporated by reference. It is not the intent of the inventors to restrict the present invention for use solely with the invention disclosed in application Ser. No. 10/096,191. Any system or method that has a need to remove jitter and/or clock drifting may make use of the present invention.

To ensure real-time delivery, the Real-Time Transport Protocol (RTP) is used in the transport of packets to gateway 106. RTP is an Internet Protocol for transmitting real-time data, such as audio and video. RTP itself does not guarantee real-time delivery of data, but it does provide time stamps that aid in the real-time delivery of data. RTP is used to send data in one direction with no acknowledgement. The header of each RTP packet contains a time stamp so the recipient can reconstruct the timing of the original data, as well as a sequence number, which lets the recipient deal with missing, duplicate or out-of-order packets. The Internet Engineering Task Force (IETF) describes RTP in RFC 1889. The International Telecommunication Union employs RTP in the multimedia communications standard H.323

In a video example, an RTP packet typically consists of about six MPEG packets. In the present invention, video source 102 will attach a sending timestamp to every RTP packet sent to gateway 106. At gateway 106, a receiving timestamp will be recorded for every MPEG packet. Since the first MPEG packet inside one RTP packet contains both a sending timestamp and arrival timestamp, the jitter can be removed by using these packets only. This requires that all the packets are sent to one channel buffer by utilizing drifting compensation and de-jittering methods such as adaptive tracking as described in application Ser. No. 10/096,191 referenced above.

In the case of a Single Programming Transport Stream (SPTS) only one stream is provided and thus a method such as adaptive tracking or some other per-stream tracking method may be applied directly to the stream. A single program, be it video with sound or simply sound, will be transported on an SPTS. Multiple SPTS' may be multiplexed to form a Multiple Program Transport Stream (MPTS).

In the case of MPTS transmission, the processing will be complicated since packets from the same stream of the same video source 102 generally are sent to different channel buffers due to different demux (demultiplexing) requests. Packets which are bundled into the same RTP packet by video source 102 will generally be sent to different channel buffers at gateway 106. Since only the first MPEG packet within an RTP packet has both the sending and receiving timestamps, other packets within the same RTP packet lack a sending time and thus they are not directly usable in removing the jitter. In short, lack of adequate information makes the jitter removal for each channel buffer difficult.

Although one might attempt to remove jitter first before feeding the stream to a demux module within gateway 106, this will usually require dramatic hardware and software architecture changes and usually have higher overhead than removing jitter after demuxing. The present invention removes jitter in an MPTS stream after demuxing is done.

The present invention functions as follows. Every incoming MPEG packet received from IP network 104 at gateway 106 will be stamped with two indices by hardware or software. The first index is a per-flow index which increases by 1 for every MPEG packet from the same stream (i.e. the same session) from the video source 102. The second index is an internal index, which increases by 1 for every MPEG packet within one RTP packet and is reset to 0 when another RTP packet comes in. For an MPEG packet which doesn't contain a sending timestamp, those two indices and the sending timestamp for the RTP packet will is be used to calculate the sending timestamp for the MPEG packet. We refer to this processing as sending timestamp adjustment since the original time stamp conceptually only applies to the RTP packet, i.e. the first MPEG packet within the RTP packet.

Every MPEG packet of an MPTS stream received at gateway 106 from IP network 104, after processing by a demux module will have four parameters relevant to the present invention:

1) the per-flow index;
2) the internal index.
3) the sending timestamp; and
4) the arrival timestamp;

Each RTP packet arriving at gateway 106 will contain a sending RTP timestamp. Although the inventors refer to the well known RTP protocol, any other protocol that provides a timestamp attached to a packet containing groups of streaming media packets may also utilize the present invention. The remaining three parameters are provided by gateway 106.

Figure 2:
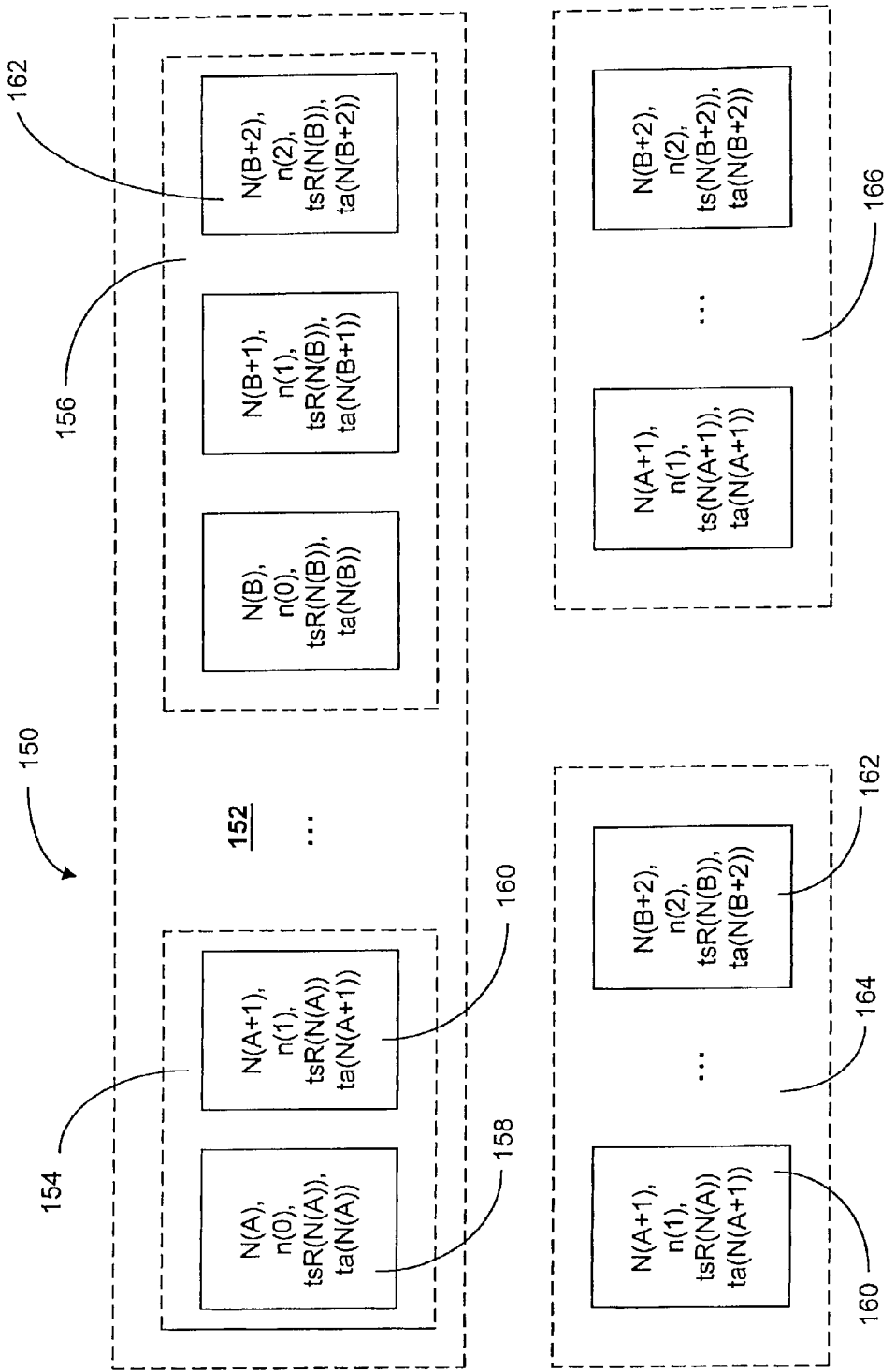
FIG. 2 is a block diagram of a series of RTP packets.

Referring now to FIG. 2, a block diagram of a series of RTP packets is shown generally as 150. An MPTS stream 152 contains RTP packet 154 and RTP packet 156. MPEG packet 160 in RTP packet 154 and MPEG packet 162 in RTP packet 156 belong to one program and they are demuxed to one channel buffer as shown in 164. Other MPEG packets will be demuxed to their respective channel buffers. This invention will try to adjust the sending timestamp of every MPEG packet in 164. The result of the adjustment is shown in buffer 166. Packet 154 contains two MPEG packets 158 and 160. Within MPEG packets 158 and 160 are four parameters which are shown from top to bottom, namely:

1) per-flow index;
2) internal index;
3) sending timestamp tsR( ) and
4) arrival timestamp ta( ).

All MPEG packets within one RTP packet will have the same sending timestamp tsR( ). All other parameters will vary for each MPEG packet within an RTP packet.

The MPEG packets from MPTS stream 152 are demultiplexed and placed in channel buffers such as buffer 164. However, the sending timestamp tsR( ) for each packet cannot used to remove jitter since the sending timestamp tsR( ) refers to the original RTP packet before de-multiplexing.

The present invention adjusts the sending time of each MPEG packet after de-multiplexing, by creating a sending time ts( ) for each MPEG packet as shown in buffer 166. Sending time ts( ) may then be used to reduce jitter in buffer 166.

Figure 3:
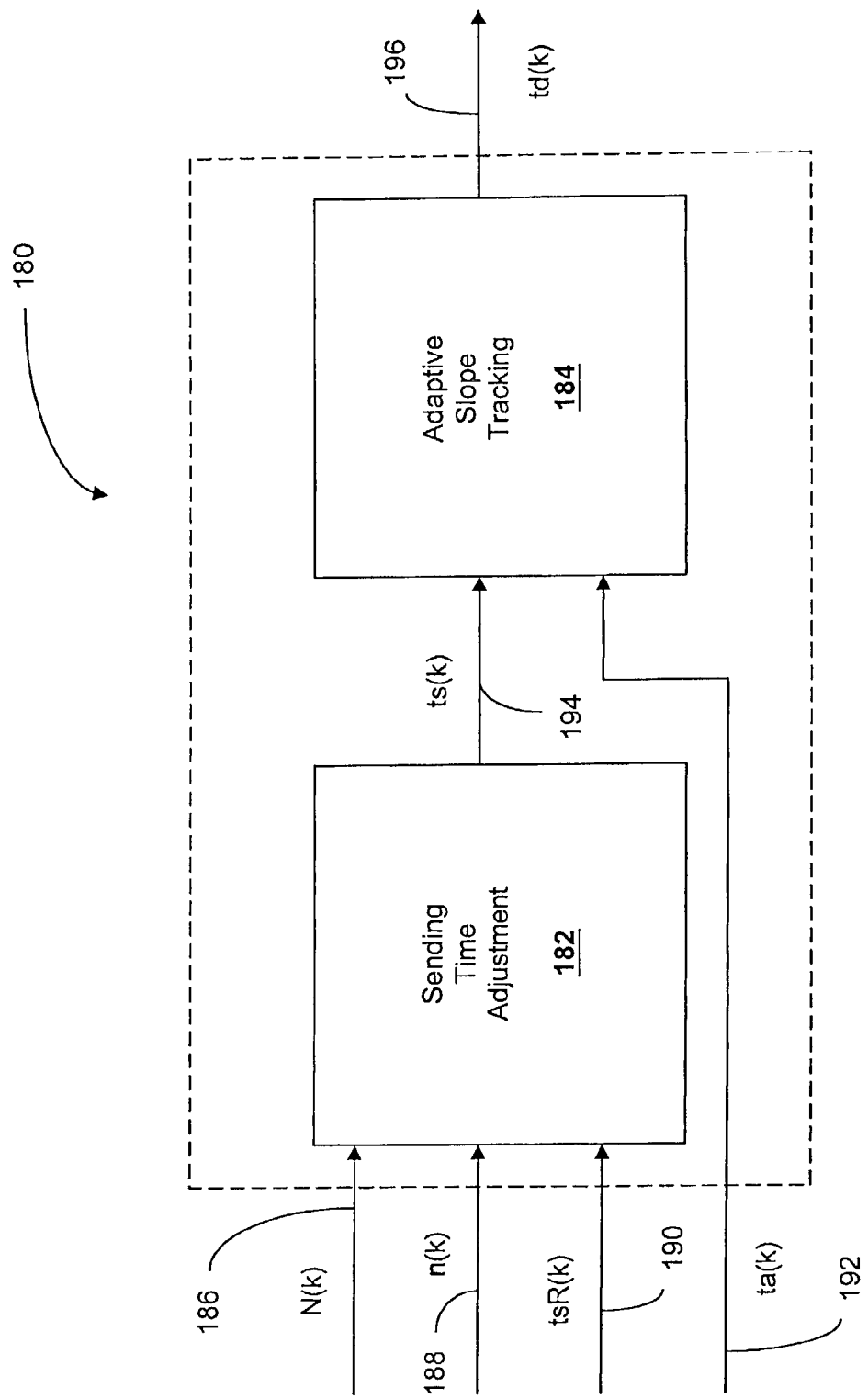
FIG. 3 is a block diagram of a system for MPTS clock drifting compensation and de-jittering.

Referring now to FIG. 3, a block diagram of a system for MPTS clock drifting compensation and de-jittering is shown generally as 180.

The present invention is contained within sending time adjustment module 182. The function of adaptive slope tracking module 184 is described in detail in pending U.S. application Ser. No. 10/096,191 incorporated earlier by reference. However, it is not the intent of the inventors to restrict the present invention to function only with adaptive slop tracking module 184, this simply serves an example of a per-stream tracking module. In general the present invention may be utilized by any system where a plurality of streaming media packets are contained within another packet such as with RTP.

N(k) 186 is the per-flow index of an MPEG packet. The value of n(k) 188 is the internal index for an MPEG packet within an RTP packet. The value of tsR(k) 190 is the sending timestamp for an RTP packet and ta(k) 192 is the arrival timestamp for an MPEG packet. Sending time adjustment module 182 produces a sending time value ts(k) 194 which when combined with arrival timestamp ta(k) 102 provides a delivery time td(k) 192 for an MPEG packet "k".

Figure 4:
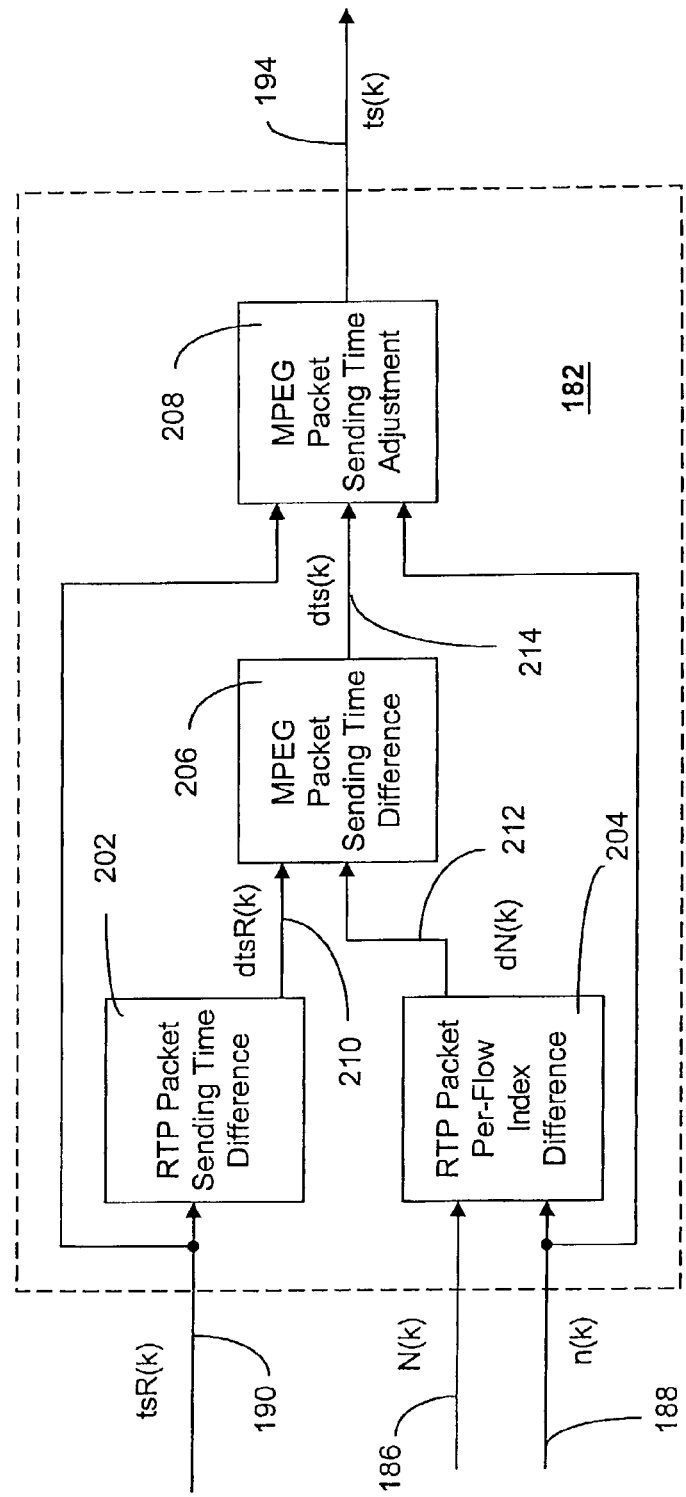
FIG. 4 is a block diagram of a sending time adjustment module.

Referring now to FIG. 4 a block diagram of a sending time adjustment module is shown as 182. Module 182 comprises four modules, namely: RTP packet sending time difference module 202, RTP packet per-flow index difference module 204, MPEG packet sending time difference module 206 and MPEG packet sending time adjustment module 208.

The function of modules 202, 204, 206 and 208 will be described by mathematical equations and Digital Signal Processor (DSP) signal-flow graphs, which use the symbols shown in Legend 1.

Legend 1

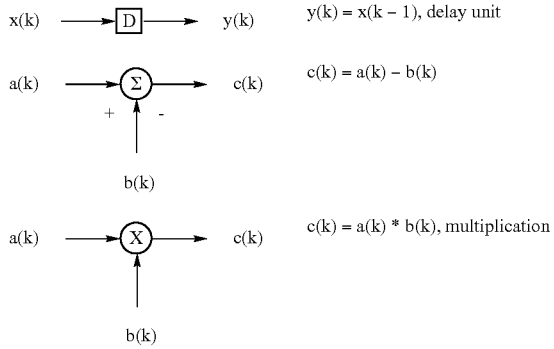

Legend 1

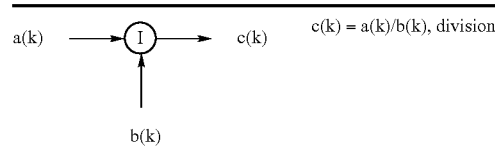

$c(k) = a(k)/b(k)$, division

Figure 5:
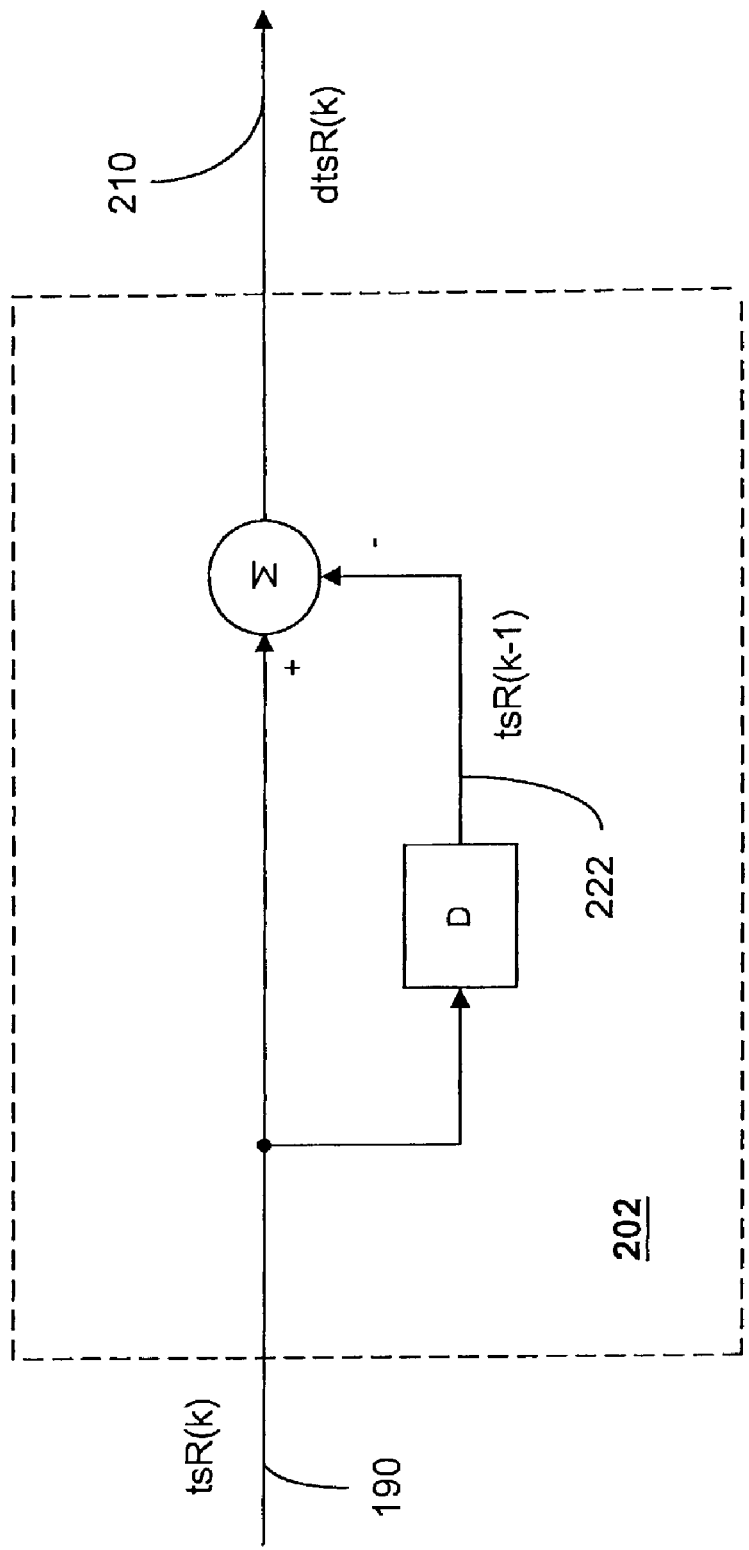
FIG. 5 is a logic diagram of a RTP packet sending time difference module.

Referring now to FIG. 5, a logic diagram of a RTP packet sending time difference module 202 is shown. After demuxing, for every MPEG packet belonging to a new RTP packet, module 158 calculates a sending time difference dtsR(k) 210 between the sending timestamp of the current RTP packet (tsR(k)) and the sending timestamp of the previous RTP (tsR(k−1)). The value of dtsR(k) 210 is calculated as follows:

$$dtsR(k)=tsR(k)-tsR(k-1)$$

Figure 6:
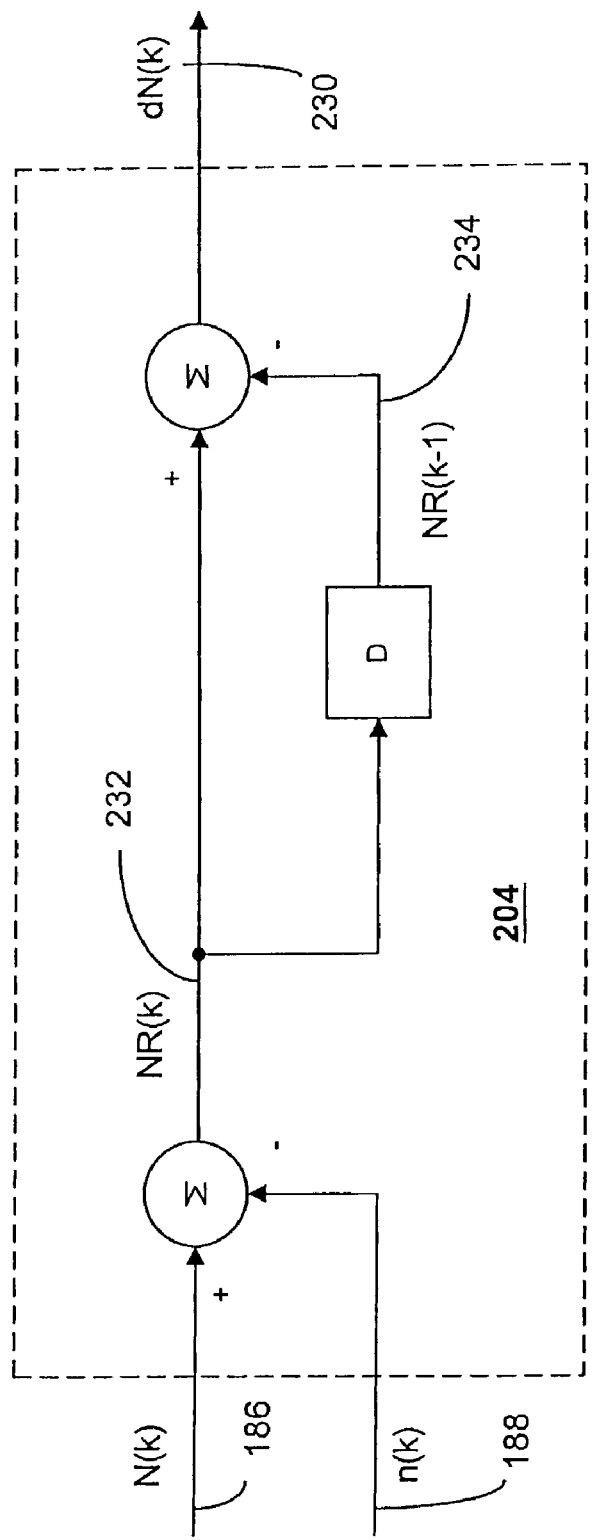
FIG. 6 is a logic diagram of a RTP packet per-flow index module.

Referring now to FIG. 6, a logic diagram of a RTP packet pre-flow index module 204 is shown. After demuxing, for every MPEG packet belonging to a new RTP packet, module 204 calculates the per-flow index difference dN(k) 212. Module 204 accepts as input per-flow index N(k) 186 for the current MPEG packet and internal index n(k) 188 which identifies the position of the current MPEG packet within an RTP packet.

The values of N(k) 186 and n(k) 188 are combined to produce the per-flow index difference NR(k) 232 for the current MPEG packet by the following equation:

$$NR(k)=N(k)-n(k)$$

The value of dN(k) 212 is calculated by subtracting the previous per-flow index difference NR(k−1) 234 from NR(k) 234, namely:

$$dN(k)=NR(k)-NR(k-1)$$

Figure 7:
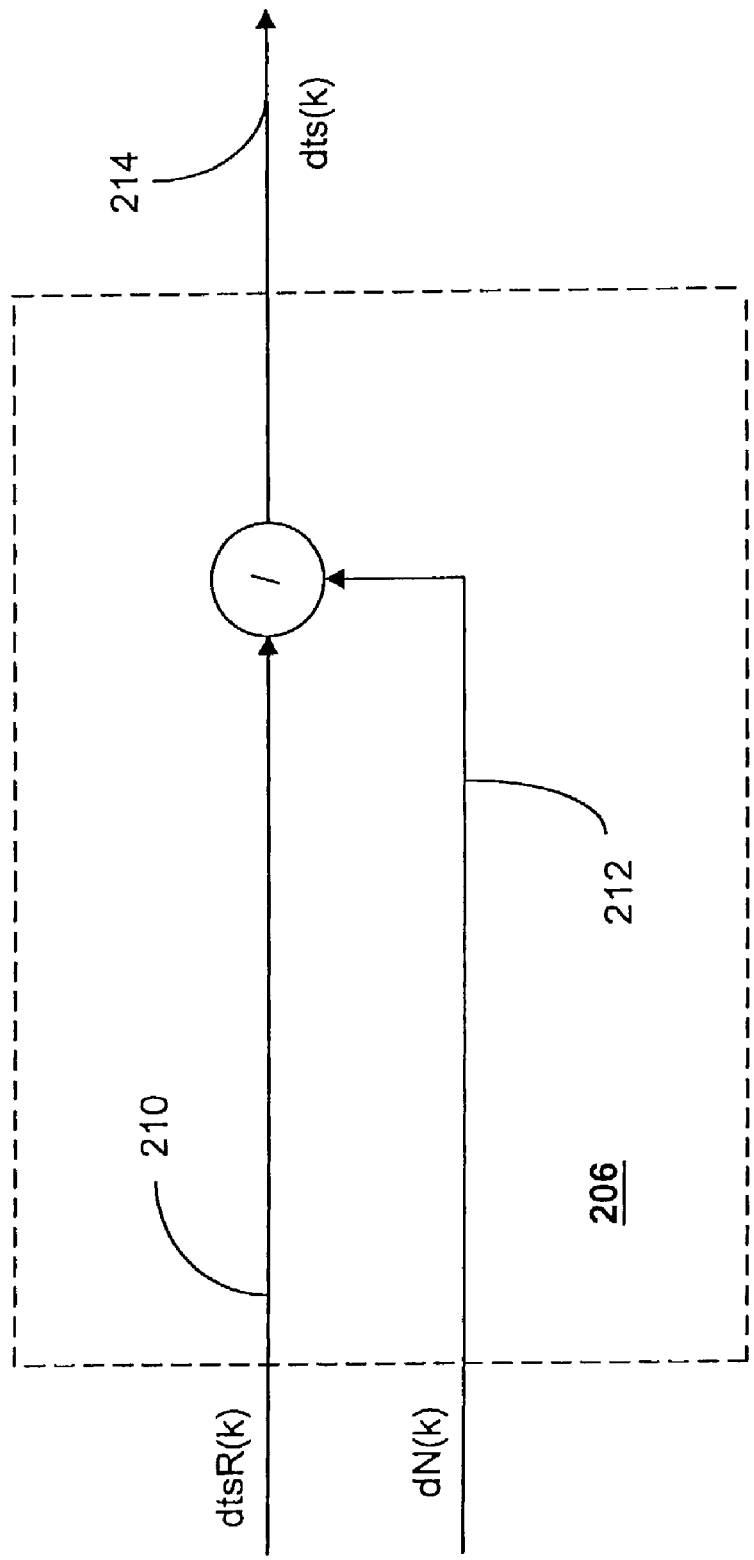
FIG. 7 is a logic diagram of a MPEG packet sending time difference module.

Referring now to FIG. 7 a logic diagram of a MPEG packet sending time difference module 206 is shown.

Module 206, calculates the sending time difference between two consecutive MPEG packets which is output as dts(k) 214. This is achieved by applying the formula:

$$dts(k)=dtsR(k)/dN(k)$$

Where dtsR(k) 210 is the sending time difference output by module 202 and dN(k) 212 is the difference between two consecutive RTP packets as output by module 204.

Figure 8:
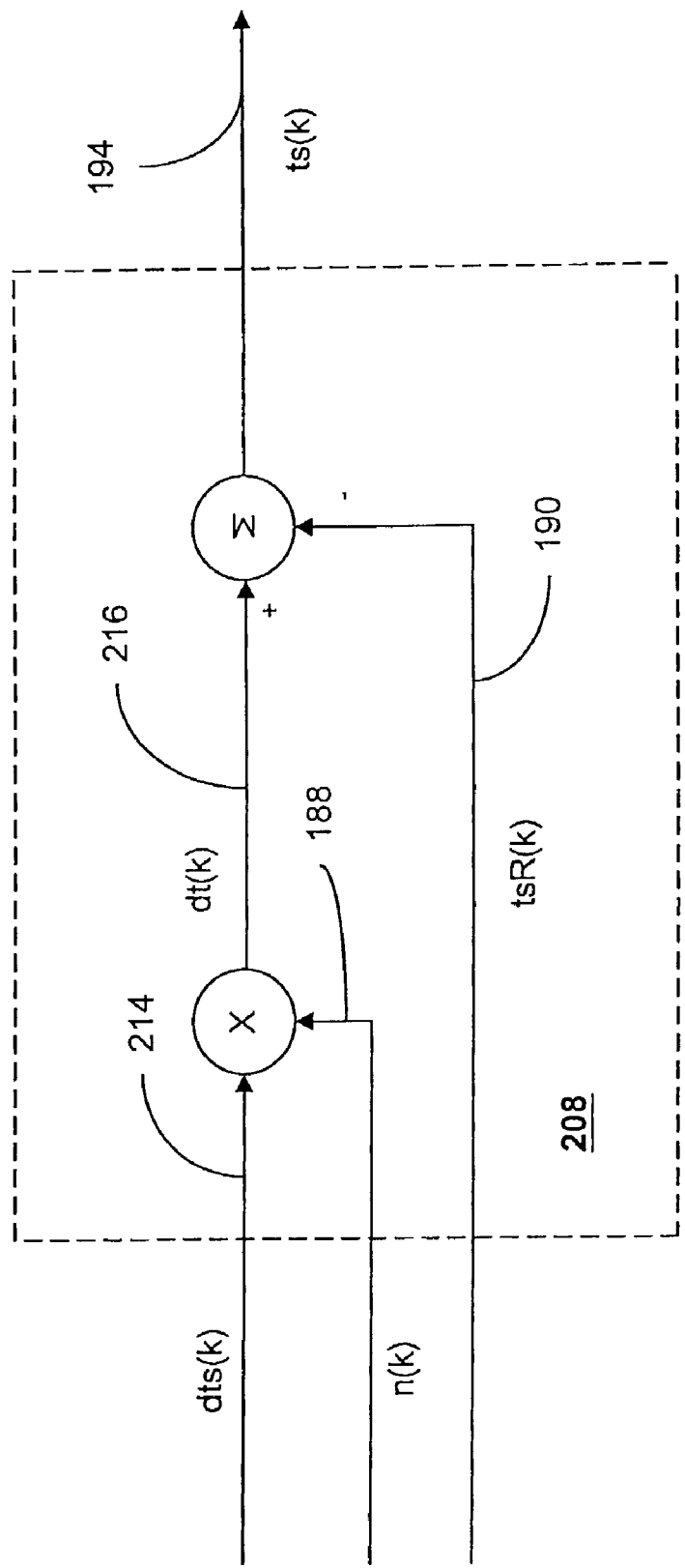
FIG. 8 is a logic diagram of a MPEG packet sending time adjustment module.

Referring now to FIG. 8 a logic diagram of a MPEG packet sending time adjustment module 208 is shown. Module 208 produces a sending time ts(k) 194 for each MPEG packet. This is achieved by utilizing the following input values:

1) tsR(k) 190, the sending time stamp of the RTP packet to which the current MPEG packet belongs;

2) dts(k) 214, the sending time difference between two consecutive MPEG packets; and 3) n(k) 188, the internal index of the MPEG packet within the RTP packet to which the current "k" MPEG packet belongs.

The time difference between the current MPEG packet and the first (0-th) MPEG packet within the RTP packet is dt(k) 216, which is calculated as:

$$dt(k)=dts(k)*n(k)$$

Adding the value of dt(k) 216 to the sending timestamp tsR(k) 190 of the RTP packet (i.e, the sending time of the first MPEG packet within the RTP packet), results in a sending time ts(k) 194 for the current MPEG packet. This calculation is:

$$ts(k)=dt(k)+tsR(k)$$

In a Video on Demand (VoD) system, with the incorporation of the present invention, an MPTS stream can be demuxed into different channel buffers without any constraint and a session can run arbitrarily long time without playing-back disruption at decoder 110 caused by buffer underflow or overflow.

By avoiding the step of jitter removal before demux and opting to do it after demux, the present invention does not require new hardware and can be implemented in DSP software without a dramatic hardware architecture change. However, the inventors recognize that the present invention may be implemented in hardware if so chosen by the implementor of the present invention.

The present invention requires moderate computation, and can be implemented in fixed-point. Most of the computations required to process each MPEG packet are addition, subtraction, and multiplication. For calculating the sending time difference between two consecutive MPEG packets, dts(k), only one division is needed between two packets belonging to different RTP packets.

Although this disclosure and the claims refer to RTP packets it is not the intent of the inventors to restrict the invention solely to RTP. By RTP it is the inventors intent to encompass any protocol that creates large packets encapsulating streaming media packets and attaches a timestamp to those large packets, such as RTP does with MPEG.

Although the disclosure of the present invention utilizes Video on Demand (VoD) as an example, it is not the intent of the inventors to restrict the present invention to VoD systems. The present invention may be utilized in any form of streaming media that needs to address the issue of jitter and or clock drifting. The present invention is applicable to any streaming media that requires synchronization between source and destination. This includes multicast video, multicast audio, streaming video/audio, multimedia gaming, or multimedia conferencing. Thus, although the description refers to MPEG by way of example, it is the intent of the inventors that the present invention not be restricted simply to MPEG.

The types of networks that may be used include IP, MMDS, LMDS, satellite distribution, local video distribution network, ATM, SONET/SDH, fixed/mobile wireless, and Ethernet/firewire.

Although the invention has been described with reference to certain specific embodiments, various modifications thereof will be apparent to those skilled in the art without departing from the spirit and scope of the invention as outlined in the claims appended hereto.

We claim:

1. A system for producing a sending time for a packet in streaming media, said system comprising a sending time adjustment module said adjustment module operatively connected to an per-stream tracking module and providing said per-stream tracking module with a sending time for each said packet in streaming media, to reduce jitter and clock drifting;
   wherein said sending time adjustment module comprises:
   a) a RTP packet sending time difference module;
   b) a RTP packet per-flow index difference module;
   c) a streaming media packet sending time difference module operatively connected to said RTP packet sending time difference module and said RTP packet per-flow index difference module; and
   d) a streaming media packet sending time adjustment module operatively connected to said streaming media packet sending time difference module.

2. The system of claim 1 wherein said RTP packet sending time difference module accepts as input a sending timestamp for an RTP packet and utilizes said sending timestamp for an RTP packet to output a sending time difference.

3. The system of claim 1 wherein said RTP packet per-flow index difference module accepts as input a per-flow index and a internal index to output a per-flow index difference.

4. The system of claim 1 wherein said streaming media packet sending time difference module accepts as input a sending time difference and a per-flow index difference to generate a sending time gap.

5. The system of claim 1 wherein said streaming media packet sending time adjustment module accepts as input a sending time gap, an internal index and a sending timestamp to generate a sending timestamp.

6. A method for producing a sending time for a packet in streaming media, said method comprising the steps of:
   a) accepting a sending timestamp for a current packet;
   b) accepting a per-flow index;
   c) accepting an internal index;
   d) utilizing said sending timestamp to create a sending time difference;
   e) utilizing said per-flow index and said internal index to create a per-flow index difference between two consecutive RTP packets;
   f) utilizing said sending time difference and said per flow index difference between two consecutive RTP packets to create a sending time difference between two consecutive streaming media packets; and
   g) utilizing said sending time difference between two consecutive streaming media packets, said internal index and said sending timestamp to produce said sending time for a packet in streaming media.

7. The method of claim 6, wherein creating said sending time difference at step d) comprises the step of combining said sending timestamp for a current packet with a sending timestamp of an immediately preceding packet.

8. The method of claim 6, wherein creating said per-flow index difference between two consecutive RTP packets at step e) comprises the steps of:
   i) combining said internal index from said per-flow index to create a per-flow index difference; and
   ii) combining said per-flow index difference with the previous pre-flow index difference.

9. The method of claim 6 wherein creating said sending time difference between two consecutive streaming media packets at step f) comprises the step of dividing said sending time difference by said per-flow index difference between two consecutive RTP packets.

10. The method of claim 6 wherein producing said sending time for a packet in streaming media at step g) comprises the steps of:
   i) multiplying said sending time difference between two consecutive streaming media packets with said internal index, to create a time difference between the current streaming media packet and the first streaming media packet within the current RTP packet;
   ii) combining said time difference between the current streaming media packet and the first streaming media packet within the current RTP packet with said sending timestamp to produce said sending time for a packet in streaming media.

11. A computer readable medium storing instructions for producing a sending time for a packet in streaming media, when executed by a computer causes the computer to perform the steps of:
 a) accepting a sending timestamp for a current packet;
 b) accepting a per-flow index;
 c) accepting an internal index;
 d) utilizing said sending timestamp to create a sending time difference;
 e) utilizing said per-flow index and said internal index to create a per-flow index difference between two consecutive RTP packets;
 f) utilizing said sending time difference and said per flow index difference between two consecutive RTP packets to create a sending time difference between two consecutive streaming media packets; and
 g) utilizing said sending time difference between two consecutive streaming media packets, said internal index and said sending timestamp to produce said sending time for a packet in streaming media.

12. The computer readable medium of claim 11, wherein creating said sending time difference at step d) comprises instructions for combining said sending timestamp for a current packet with a sending timestamp of an immediately preceding packet.

13. The computer readable medium of claim 11, wherein creating said per-flow index difference between two consecutive RTP packets at e) comprises instructions for:
 i) combining said internal index from said per-flow index to create a per-flow index difference; and
 ii) combining said per-flow index difference with the previous pre-flow index difference.

14. The computer readable medium of claim 11 wherein creating said sending time difference between two consecutive streaming media packets at f) comprises instructions for dividing said sending time difference by said per-flow index difference between two consecutive RTP packets.

15. The computer readable medium of claim 11 wherein producing said sending time for a packet in streaming media at g) comprises instructions for:
 i) multiplying said sending time difference between two consecutive streaming media packets with said internal index, to create a time difference between the current streaming media packet and the first streaming media packet within the current RTP packet; and
 ii) combining said time difference between the current streaming media packet and the first streaming media packet within the current RTP packet with said sending timestamp to produce said sending time for a packet in streaming media.

16. A system for producing a sending time for a packet in streaming media, said system comprising a means for sending time adjustment said means for time adjustment operatively connected to means for per-stream tracking and providing said means for per-stream tracking with a sending time for each said packet in streaming media, to reduce jitter and clock drifting, wherein said means for sending time adjustment accepts as input:
 a) a per-flow index;
 b) an internal index; and
 c) a sending timestamp for an RTP packet;
said means for sending time adjustment utilizing said input to create said sending time;
wherein said means for sending time adjustment comprises:
 a) means for determining an RTP packet sending time difference;
 b) means for determining an RTP packet per-flow index difference;
 c) means for determining a streaming media packet sending time difference operatively connected to said means for determining an RTP packet sending time difference and said means for determining an RTP packet per-flow index difference; and
 d) means for adjusting a streaming media packet sending time operatively connected to said means for determining a streaming media packet sending time difference.

17. The system of claim 16 wherein said means for determining an RTP packet sending time difference accepts as input a sending timestamp for an RTP packet and utilizes said sending timestamp for an RTP packet to output a sending time difference.

18. The system of claim 16 wherein said means for determining an RTP packet per-flow index difference accepts as input a per-flow index and a internal index to output a per-flow index difference.

19. The system of claim 16 wherein said means for determining a streaming media packet sending time difference accepts as input a sending time difference and a per-flow index difference to generate a sending time gap.

20. The system of claim 16 wherein said means for adjusting a streaming media packet sending time accepts as input a sending time gap, an internal index and a sending timestamp to generate a sending timestamp.

\* \* \* \* \*